Patented Sept. 6, 1949

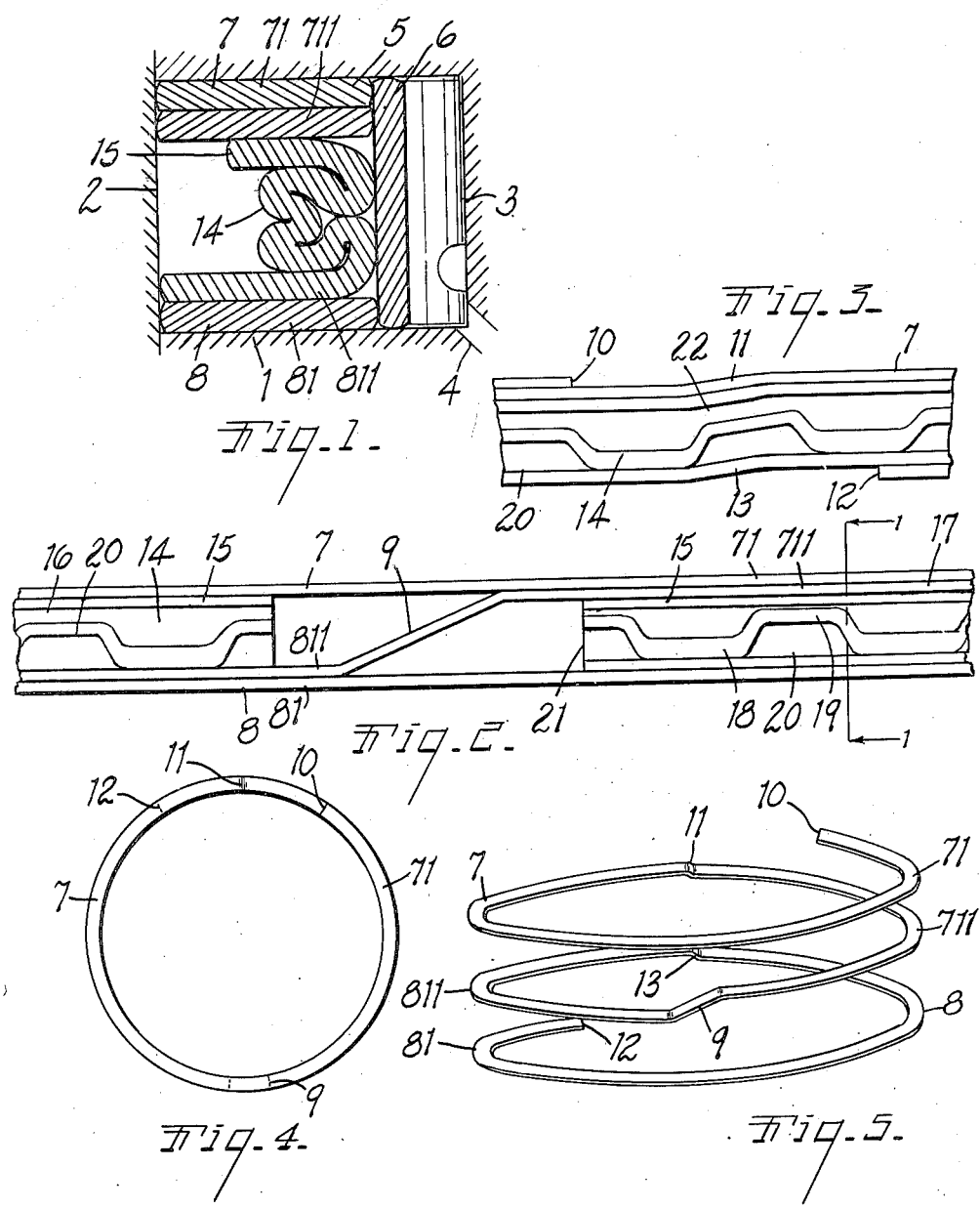

2,481,340

UNITED STATES PATENT OFFICE 2,481,340

PISTON RING

Harold P. Phillips, Hastings, Mich., assignor to Hastings Manufacturing Company, Hastings, Mich.

Application August 30, 1948, Serial No. 46,900

9 Claims. (Cl. 309—48)

1

This invention relates to improvements in piston rings.

The main objects of the invention are:

First, to provide a piston ring assembly which is highly efficient from the standpoint of effective sealing and also from the standpoint of oil control.

Second, to provide a ring assembly in which there is no gap opening thereby permitting effective sealing and the prevention of "blow-by."

Third, to provide a ring assembly which facilitates assembly of the parts in exact operative position and maintenance thereof in such position during operative use.

Fourth, to provide a piston ring assembly which provides improved tensioning of the ring segments against the cylinder wall.

Objects relating to details and economies of my invention will appear from the description to follow. The invention is pointed out and defined in the claims.

A preferred embodiment of my invention is illustrated in the accompanying drawing in which:

Fig. 1 is an enlarged fragmentary view showing in section a cylinder, a piston, and a ring assembly assembled in the groove of the piston, the ring assembly being shown in section on the line 1—1 of Fig. 2.

Fig. 2 is an enlarged fragmentary edge view of the piston ring assembly showing the relative position of the parts when viewing one of the side edges of the assembly.

Fig. 3 is an enlarged fragmentary edge view of the ring assembly showing the relative position of the parts when viewing the assembly opposite from that shown in Fig. 2.

Fig. 4 is a plan view of a cylinder wall engaging ring side member of the assembly.

Fig. 5 is a perspective view of the upper and lower cylinder wall engaging side members of the assembly, said side members being integrally connected by an axially extending offset portion.

The assembly herein disclosed is a modification of that disclosed in my copending application for piston rings, Serial Number 722,699, filed January 17, 1947, now Patent No. 2,460,431.

In considering the accompanying drawing it should be borne in mind that no attempt has been made to show the parts in their relative proportion and where associated with the piston to show the clearances and relative dimensions.

In the embodiment of my invention illustrated 1 designates the piston and 2 the cylinder of an internal combustion engine. The piston is provided with a groove 3 and oil drainage passage 4 leading from the bottom of the groove through the piston wall. Disposed in the groove 3 is the piston ring or piston ring assembly designated generally by the reference numeral 5. An expander spring 6 of sinuous form as is common in the art engages the inner side of the ring assembly to force the same into engagement with the cylinder wall.

My improved ring assembly comprises a pair of spaced thin steel expansible upper and lower side members 7 and 8 integrally connected by the axially extending offset portion 9. In practice the side members 7 and 8 are formed of one continuous piece of flat steel stock coiled edgewise. The upper side member 7 extends from the free end 10 thereof to the lateral offset 9 and the opposite end portions 71 and 711 thereof overlap for approximately 180°. The side member 7 is provided with an axially extending offset portion 11 and its free end 10 terminates in slightly spaced relation from this offset portion to permit contraction and expansion of the side member when the assembly is placed in the ring groove. Similarly the side member 8 extends from its free end 12 to the lateral offset 9, and the opposite end portions 81 and 811 thereof overlap for approximately 180°. The side member 8 is provided with an axially bent offset portion 13, and its free end 12 terminates in slightly spaced relation from this offset portion to permit contraction and expansion of the side member when the assembly is placed in the ring groove. The side members 7 and 8 are so formed that when in position in the piston ring groove 3 they are under compression and urged yieldingly outwardly against the cylinder wall.

The axially bent or offset portion 11 in the upper side member 7 extends an axial distance approximately equal to the thickness of the stock of the side member. This permits the lower overlapping end portion 711 to be beneath the general plane of the side member and permits the upper surface of the side member to be all substantially in a plane so as to engage the upper wall of the ring groove 3 throughout substantially the entire circumference thereof, such engagement being permitted except for the relatively short distance between the end 10 and the offset or bent portion 11, as shown in Fig. 3. Likewise, the bent or offset portion 13 of the lower side member 8 extends an axial distance approximately equal to the thickness of the stock of the side member and this permits the upper overlapping end portion to be above the general plane of the side member and permits the lower surface of the side member to be all substantially in a plane so as to engage the lower wall of the ring groove throughout substantially the entire circumference thereof, such engagement being permitted except for the relatively short distance between its free end 12 and the offset or bent portion 13 as shown in Fig. 3.

The side members 7 and 8 are held in spaced relation by the intermediate or spacer member 14. The combined thickness of the side members and spacer member is such as to fit the ring groove 3 with the necessary clearance to permit expansive movement without binding. The spacer member 14 is formed of ductile metal folded upon itself into a plurality of integrally connected plies or folds disposed in side by side relation, the upper ply 15 in each of the opposite halves 16 and 17 thereof being flat and the remaining lower plies being conformed to provide alternate spacer and drain reaches 18 and 19, respectively. The drain reaches 19 provide passageways 20 through the ring assembly for passage of oil therethrough to the rear of the ring assembly and then to the oil drain openings 4 through the piston wall.

The spacer member 14 has a split or joint 21 with the ends on the opposite sides of the joint spaced as shown in Fig. 2 to permit contraction and expansion of the spacer when placed in the ring groove. Located in this space between the ends of the spacer is the bent or offset portion 9 connecting the lower end portion 711 of the upper side member 7 to the upper end portion 811 of the lower side member 8. Opposite from its split or joint 21, the spacer element is provided with a relatively short axially bent or offset portion 22 extending axially of the ring assembly to permit the diametrically opposite side portions 16 and 17 on the opposite sides of the offset portion 22 to lie in parallel axially spaced planes. When the spacer member 14 is in assembled relation with the side members 7 and 8 in the ring groove, the lower end portion 711 of the upper side member 7 overlappingly engages the lower offset portion 17 of the spacer, and the upper end portion 811 of the lower side member 8 overlappingly engages the upper offset portion 16 of the spacer, as shown in Fig. 2. Also when the side members 7 and 8 and spacer 14 are in assembled relation in the ring groove their axially bent portions 11, 13 and 22 are in substantially parallel superimposed relation, as shown in Fig. 3. The spacer member 14 is under compression and is urged yieldingly outwardly by its tension against the cylinder wall.

Providing the connecting axially extending offset portion 9 between the upper and lower side members 7 and 8 and disposing the same in the gap between the spaced ends of the spacer, opposite from the axially bent offset portion 22 in the spacer, provides a very simple means limiting or preventing circumferential shifting of the spacer element relative to side members 7 and 8 and consequent binding of the ring elements where the axially bent offset portion 22 is formed in the spacer. The crossing over through the gap also facilitates installation, inasmuch as it gives a locating point of the one and one half wrapped side members relative to the offset spacer.

Also from the standpoint of improvement in performance the cross-over of the connecting portion 9 through the gap 21 of the spacer 14 doubles up the snubbing action of the side members 7 and 8, working from a large diameter down the cylinder to a small diameter, in that it results in the coils around the piston being multiplied from two one and one half turns acting separately to a total of three acting together. The fact must be kept in mind that all cylinders are tapered when hot and at normal running temperature, therefore, in new supposedly straight cylinders, a snubbing action is developed as the ring moves down the cylinder wall and a corresponding releasing action occurs as the ring moves up the cylinder wall. This snubbing and releasing action is further increased in worn cylinders which makes an increase in snubbing for worn cylinders desirable.

My improved composite piston ring or ring assembly is highly efficient from the standpoint of oil control, sealing or "blow-by" prevention and generally improved performance. It is desirable for use in new engines and is especially desirable for use with old or worn cylinders and pistons. It may be very economically produced and readily assembled and when assembled the parts are securely retained against relative circumferential shifting without binding action in the ring groove.

I have described and illustrated and embodiment or adaptation of my invention which I find highly satisfactory. I have not attempted to illustrate or describe other embodiments or adaptations which I contemplate as it is believed that this disclosure will enable those skilled in the art to embody or adapt my improvements as may be desired.

Having thus described my invention, what I claim as new and desire to secure by Letters Patent, is:

1. A piston ring assembly comprising spaced thin expansible side members and a split expansible spacer member intermediate said side members, said side members being disposed to present their outer edges to a cylinder wall and disposed to present their outer side surfaces to the opposite side walls of a piston ring groove, each side member having end portions overlapping approximately one-half the circumference of the side members and having an axially inwardly offset portion disposed at the attached end of one end portion and adjacent the free end of the other end portion, the offset portion in axial extent being approximately equal to the thickness of said adjacent end portion, the offset portion permitting the outer face of the side member to lie substantially entirely in a plane and permitting said face to engage the side wall of a ring groove substantially the entire length of the circumference of said side wall, said offset portion being circumferentially slightly spaced from said adjacent end to permit the side member to expand and contract in a ring groove, said spacer member being formed of ductile metal folded upon itself into a plurality of integrally connected superimposed plies, the bottom wall of the spacer member being upwardly bent at spaced intervals to provide alternate spacer and drain reaches, said spacer member opposite from the split thereof having an axial offset portion to permit the portions on the opposite sides thereof to lie in axially spaced planes, the axially offset portions of the side members and spacer member being in substantially axial superimposed relation, the spacer member having a gap at the split thereof, the inner ends of the side members being integrally connected by an axially extending offset portion disposed in the gap of the spacer member.

2. A piston ring assembly comprising spaced thin expansible side members and a split expansible spacer member intermediate said side members.

said side members being disposed to present their outer edges to a cylinder wall and disposed to present their outer side surfaces to the opposite side walls of a piston ring groove, each side member having end portions overlapping approximately one-half the circumference of the side members and having an axially inwardly offset portion disposed at the attached end of one end portion and adjacent the free end of the other end portion, the offset portion in axial extent being approximately equal to the thickness of said adjacent end portion, the offset portion permitting the outer face of the side member to lie substantially entirely in a plane and permitting said face to engage the side wall of a ring groove substantially the entire length of the circumference of said side wall, said offset portion being circumferentally slightly spaced from said adjacent end to permit the side member to expand and contract in a ring groove, said spacer member opposite from the split thereof having an axial offset portion to permit the portions on the opposite sides therof to lie in axially spaced planes, the axially offset portions of the side members and spacer member being in substantially axial superimposed relation, the spacer member having a gap at the split thereof, the inner ends of the side members being integrally connected by an axially extending offset portion disposed in the gap of the spacer member.

3. A piston ring assembly comprising spaced thin expansible side members and a split expansible spacer member intermediate said side members, said side members being disposed to present their outer edges to a cylinder wall and disposed to present their outer side surfaces to the opposite side walls of a piston ring groove, each side member having end portions overlapping approximately one-half the circumference of the side members and having an axially inwardly offset portion disposed at the attached end of one end portion and adjacent the free end of the other end portion, the offset portion in axial extent being approximately equal to the thickness of said adjacent end portion, the offset portion permitting the outer face of the side member to lie substantially entirely in a plane and permitting said face to engage the side wall of a ring groove substantially the entire length of the circumference of said side wall, said offset portion being circumferentially slightly spaced from said adjacent end to permit the side member to expand and contract in a ring groove, said spacer member being formed of ductile metal folded upon itself into a plurality of integrally connected superimposed plies, said spacer member opposite from the split thereof having an axial offset portion to permit the portions on the opposite sides thereof to lie in axially spaced planes, the axially offset portions of the side members and spacer member being in substantially axial superimposed relation, the spacer member having a gap at the split thereof, the inner ends of the side members being integrally connected by an axially extending offset portion disposed in the gap of the spacer member.

4. A piston ring assembly comprising spaced thin expansible side members and a split expansible spacer member intermediate said side members, each side member having superimposed end portions overlapping each other approximately 180° and each having an axially inwardly offset portion disposed at the attached end of one end portion and adjacent the free end of its other end portion, the axial dimension of the offset portion being substantially equal to the axial thickness of the stock of the side member, said offset portion being slightly circumferentially spaced from said free end to permit the side member to expand and contract in a ring groove, said spacer member having oil drain passageways therethrough and having an axial offset portion to permit the portions of the spacer member on the opposite sides of the said offset portion to lie in axially spaced planes, the offset portions of the side members and the spacer member being disposed in superimposed relation, the spacer member having a gap at the split thereof, the inner ends of the side members being integrally connected by an axially extending offset portion disposed in the gap of the spacer member.

5. A piston ring assembly comprising spaced thin expansible side members and a split expansible spacer member intermediate said side members, each side member having superimposed end portions overlapping each other approximately 180° and each having an axially inwardly offset portion disposed at the attached end of one end portion and adjacent the free end of its other end portion, the axial dimension of the offset portion being substantially equal to the axial thickness of the stock of the side member, said offset portion being slightly circumferentially spaced from said free end to permit the side member to expand and contract in a ring groove, said spacer member having an axial offset portion to permit the portions of the spacer member on the opposite sides of the said offset portion to lie in axially spaced planes, the offset portions of the side members and the spacer member being disposed in superimposed relation, the spacer member having a gap at the split thereof, the inner ends of the side members being integrally connected by an axially extending offset portion disposed in the gap of the spacer member.

6. A piston ring assembly comprising thin expansible spaced upper and lower side members and a split expansible spacer member intermediate said side members, the side members being disposed to present their edge portions to a cylinder wall and their outer surfaces being disposed in planes for engagement with the upper and lower walls of a ring groove throughout substantially the entire circumference of the ring groove, each side member having superimposed end portions overlapping each other for approximately one-half a circumference, the axially inner superimposed end portion of each side member being connected to the body of the ring by a relatively short axial offset portion to permit said end portion to be disposed axially within the plane of the side member, said spacer member having an axially offset portion opposite the split thereof to permit the sides of the spacer member on the opposite ends of the axially offset portion thereof to be in different planes, the axial offset portions of the side members and spacer member being disposed in substantially parallel superimposed relation, the spacer member having a gap at the split thereof, the inner ends of the side members being integrally connected by an axially extending offset portion disposed in the gap of the spacer member.

7. In a piston ring assembly, expansible relatively thin side members and a split spacer member disposed intermediate said side members, said side members being disposed to present their edge portions to a cylinder wall, each side member being disposed to lie in a plane to engage a side wall of a ring groove throughout substantially the entire circumference thereof, each side member having an end portion overlapping its opposite end portion and lying in a plane axially inwardly offset from said plane of the side member, said axially inwardly offset end portion being connected to the side member by an axially offset portion, said spacer member having an axially offset portion to permit the side portions of the spacer member on the opposite sides of its axially offset portion to lie in axially spaced planes, the portion of the spacer member on one side of said axially offset portion being axially offset throughout substantially its entire length relative the portion of the spacer member on the opposite side of said axially offset portion, the axially offset portions of the side members and spacer member being in substantially axial superimposed relation, the overlapping end portions of one side member overlapping one of said axially offset side portions of the spacer member and the overlapping end portions of the other side member overlapping the other axially offset side portion of the spacer member, the spacer member having a gap at the split thereof, the inner ends of the side members being integrally connected by an axially extending offset portion disposed in the gap of the spacer member.

8. In a piston ring assembly, expansible side members and a split expansible spacer member disposed between said side members, said side members having superimposed overlapping end portions, the overlapping end portions of one side member being disposed radially on the opposite side of the ring assembly from that of the overlapping end portions of the other side member, said spacer member having an axially offset portion substantially spaced from the split thereof to permit the side portions of the spacer member on the opposite sides of the axially offset portion thereof to lie in axially spaced planes, the portion of the spacer member on one side of said axially offset portion being axially offset throughout substantially its entire length relative the portion of the spacer member on the opposite side of said axially offset portion, one of said side portions of the spacer member overlappingly engaging the axially inner end portion of one side member, and the other of said side portions of the spacer member overlappingly engaging the axially inner end portion of the other side member, the spacer member having a gap at the split thereof, the inner ends of the side members being integrally connected by an axially extending offset portion disposed in the gap of the spacer member.

9. In a piston ring assembly, relatively thin expansible axially spaced side members for engaging the opposite side walls of a piston ring groove, each side member being disposed to present an outer edge portion to a cylinder wall, each side member being disposed to lie in a plane for approximately 360° and having an axially inwardly offset end portion overlapping the opposite end portion for approximately 180° and lying in a plane parallel to the first named plane of the side member, said first named end portion being connected to the side member by an axially extending portion slightly circumferentially spaced from the opposite free end of the side member to permit expansion and contraction of the side member in a piston ring groove, the inner ends of spaced side members being integrally connected by an axially extending offset portion.

HAROLD P. PHILLIPS.

No references cited.